(12) United States Patent
Sloo

(10) Patent No.: US 8,539,529 B2
(45) Date of Patent: *Sep. 17, 2013

(54) INTEREST MESSAGING ENTERTAINMENT SYSTEM

(75) Inventor: David Hendler Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 232 days.

This patent is subject to a terminal disclaimer.

(21) Appl. No.: 13/207,294

(22) Filed: Aug. 10, 2011

(65) Prior Publication Data

US 2011/0292280 A1 Dec. 1, 2011

Related U.S. Application Data

(63) Continuation of application No. 10/153,346, filed on May 21, 2002, now Pat. No. 8,006,268.

(51) Int. Cl.
*G06F 3/00* (2006.01)
*H04N 7/16* (2011.01)
*H04N 11/00* (2006.01)

(52) U.S. Cl.
USPC .............. 725/53; 725/61; 725/136; 348/465; 348/468

(58) Field of Classification Search
None
See application file for complete search history.

(56) References Cited

U.S. PATENT DOCUMENTS

| | | | |
|---|---|---|---|
| 5,481,296 A * | 1/1996 | Cragun et al. | 725/136 |
| 5,703,655 A | 12/1997 | Corey et al. | |
| 5,970,064 A * | 10/1999 | Clark et al. | 370/351 |
| 6,144,691 A * | 11/2000 | Kenney | 375/130 |
| 6,177,931 B1 * | 1/2001 | Alexander et al. | 725/52 |
| 2002/0154891 A1 | 10/2002 | Kimura et al. | |
| 2003/0093260 A1 | 5/2003 | Dagtas et al. | |
| 2003/0221198 A1 | 11/2003 | Sloo | |
| 2004/0040042 A1* | 2/2004 | Feinleib | 725/112 |
| 2004/0148634 A1 | 7/2004 | Arsenault et al. | |
| 2005/0025469 A1 | 2/2005 | Geer et al. | |
| 2005/0028208 A1* | 2/2005 | Ellis et al. | 725/58 |
| 2006/0161952 A1* | 7/2006 | Herz et al. | 725/46 |
| 2007/0199030 A1 | 8/2007 | Ellis et al. | |
| 2009/0019485 A1* | 1/2009 | Ellis et al. | 725/40 |

* cited by examiner

*Primary Examiner* — Brian Pendleton
*Assistant Examiner* — Jean D Saint Cyr
(74) *Attorney, Agent, or Firm* — Lee & Hayes, PLLC

(57) ABSTRACT

In some implementations, closed captioning streams of textual data are extracted from video signals received by a client device. The closed captioning streams may be searched for occurrences of textual data in the closed captioning streams that match one or more search terms. When the number of matches between the search terms and a particular closed captioning stream exceeds a threshold number, a notification may be sent indicating that content programming determined to be of interest to a viewer has been located and/or the content programming may be recorded.

20 Claims, 6 Drawing Sheets

INTEREST MESSAGING ENTERTAINMENT SYSTEM

CROSS-REFERENCE TO RELATED APPLICATION

This application claims priority to U.S. patent application Ser. No. 10/153,346, filed May 21, 2002, which is incorporated by reference herein in its entirety. Any disclaimer that may have occurred during the prosecution of the above-referenced application is hereby expressly rescinded, and reconsideration of all documents of record is respectfully requested.

TECHNICAL FIELD

This invention relates to television entertainment architectures and, in particular, to an entertainment system using program products, systems, and methods for locating content of interest to a viewer.

BACKGROUND

Television broadcasting provides a ready and widespread means for mass communication. Video signals are received by a typical television system by using a set-top box, or similar device, from the television broadcasting on a cable system, a satellite system, and/or a computer network. The ever increasing number of content providers for television broadcasting provide the televisions viewers with a corresponding number of channels for viewing broadcast video content, including Network television broadcast channels, pay-per-view channels, local access channels, etc. While each channel provides different content to the viewers that are tuned into the channel with their television receivers, the content of each channel may not be of interest to each viewer. Rather, all viewers of each channel will receive all of the broadcast video signals on that channel. In any one broadcast some of the information will not be of interest to some of the viewers. In response, a viewer will change channels in order to locate content of interest, much as one would flip through the pages of a magazine in search of a photograph, headline, or text that might be of interest.

With the advent of cable and satellite systems, the number of channels offered to each subscribing viewer has been significantly increased over the former choices that were available locally through the use of an aerial antenna to receive signals at television receiver. As the number of channels offered to a subscribing viewer reaches into the range of triple digits, the task of locating content of interest becomes proportionately more difficult. Changing channels sequentially to view and determine content of interest might consume more time than that which is required to watch a television program that is of interest to the viewer. In would be an advance in the art to notify a viewer where content of likely to be of interest can be found.

SUMMARY

A stream of data is contained in video signals that are broadcast on a multiplexed channel of a broadcast network. The stream of data is received and there is extracted therefrom a closed captioning stream of textual data that is synchronized with the stream of data. The textual data is searched for occurrences of textual data matching one or more search parameters. A partial portion of the closed captioning stream of textual data that includes each of the occurrences of textual data that matches the one or more search parameters can be output for display.

DETAILED DESCRIPTION

The following discussion is directed to television-based entertainment systems that receive broadcast video signals over a broadcast network, such as interactive TV networks, cable networks, and Web-enabled TV networks. Such television-based entertainment systems range from full-resource client devices with substantial memory and processing resources, such as TV-enabled personal computers and TV recorders equipped with hard-disks (e.g. digital video recorders), to low-resource client devices with limited memory and/or processing resources, such as traditional set-top boxes. While aspects of the described program products, systems, and methods can be used in any of these systems and for any types of client devices, they are described in the context of the following exemplary environment.

Figure 1:
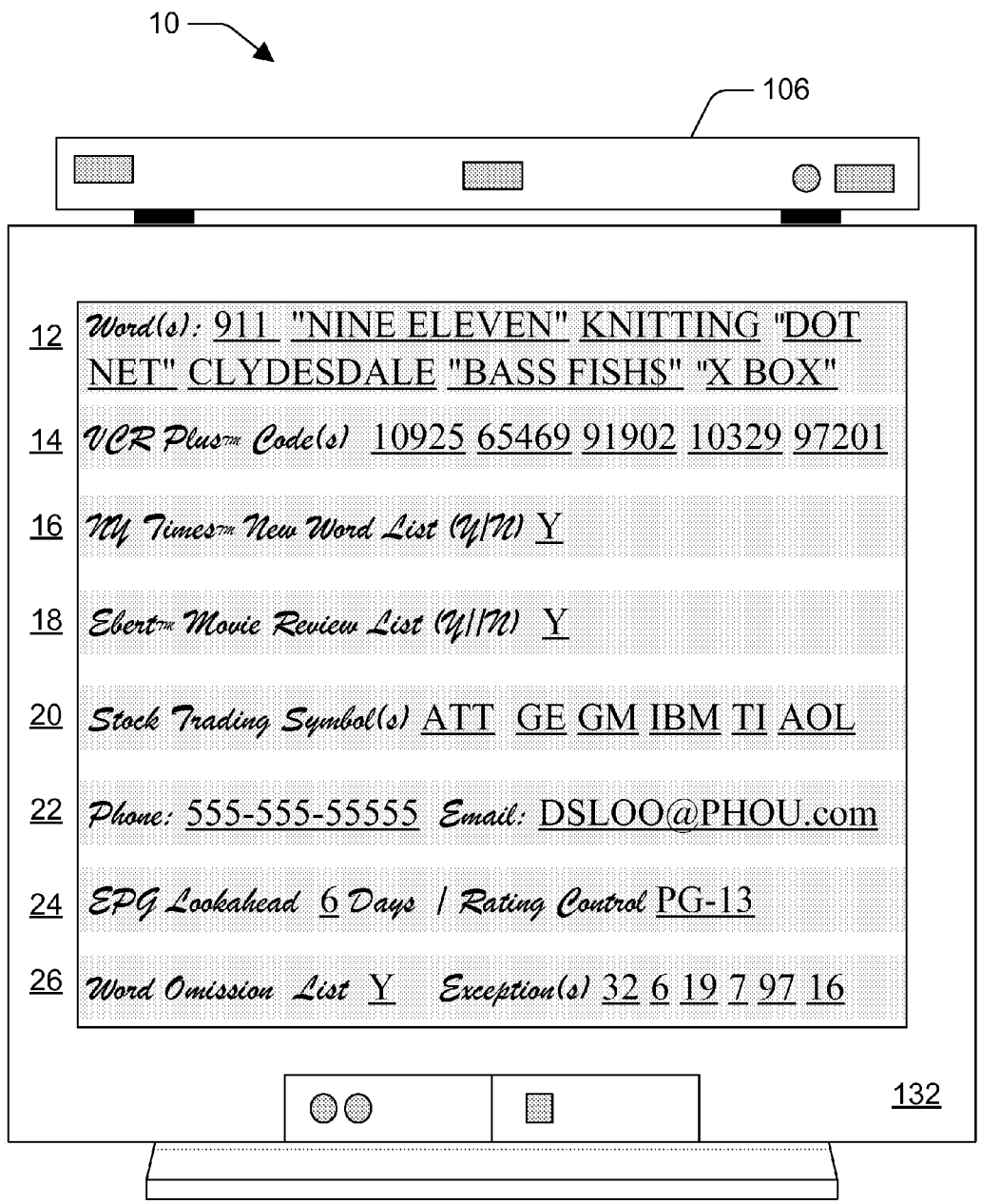
FIG. 1 illustrates, in a front elevational view, an exemplary environment in which a client device has received input from a viewer for display on a television, where the input represents subject matter of active and passive interest to the viewer.

FIG. 1 illustrates an exemplary implementation of a system 10 that includes a television-based entertainment system, such as a video data system. An example of one such entertainment system is seen in FIG. 1 as a client device 106. Client device 106 is shown as a standalone unit that connects to a television 132. Client device 106 can be implemented in any number of embodiments, including as a local client set-top box, a satellite receiver, a TV recorder with a hard disk (e.g. a digital video recorder), a game console, an information appliance, and so forth.

Television 132 shows a number of input data items that are useful in developing a recommendation mask that can be used in locating broadcast content in which a viewer is likely to have interest. A viewer is likely have interest in television programming content when the recommendation mask assesses programming content to reach a favorable finding using predetermined statistical probabilities. This finding can be based upon input initially provided by the viewer and/or can be based upon programming content that the viewer has previously viewed and/or recorded. Various algorithms can be used for the recommendation mask to locate content likely to be of interest of a viewer. The input data items seen in FIG. 1 allow a viewer to input and update data in order to express preferences for the types of television shows, network programming, and other broadcast media that the television viewer is of interest in viewing and/or recording.

In one implementation, client device 106 obtains a closed captioning script for content programming, such as a traditional broadcast television show, or a broadcast cable system movie, or a previously recorded program on a video media device such as a Video Cassette Recorder (VCR) cassette or a Digital Video Disk (DVD). The closed captioning script is found in video signals. The video signals have a data format that is used to construct individual television frames. Each frame contains video image data (i.e., pixel data) used to create images on the television screen and non-image information used to control the presentation of the image, such as synchronization and timing information. The non-image information is primarily contained within the first twenty-one lines of the television frame. These upper twenty-one lines are referred to as the Vertical Blanking Interval (VBI), and are not displayed on the television. Instead, these lines coincide with the vertical refresh period in which the cathode ray tube of the television set is moved from the lower right hand corner of the screen upon completion of one frame to the upper left hand corner of the screen for commencement of the next frame. Closed captioning data is broadcast in line 21 of the VBI. The closed captioning data provides a textual script of the audio content in the program. The textual script can be displayed concurrently with the program to assist a deaf or hearing impaired audience understand the character dialog or narration. Regulations may require that televisions be equipped with closed captioning decoding circuitry. Many video recording devices (e.g. VCR) are also designed to capture and replay the closed captioning data for a closed captioning enabled program. Closed captioning data is prevalent on broadcast television shows, syndicated shows, cable movies, and pre-recorded programs on VCR cassettes or DVDs.

A closed captioning script is almost always carried with the visible portion or primary content to the end viewer, even though other lines of the Vertical Blanking Interval may be stripped away during rebroadcast. The enhancing content can be delivered independently of the primary content and synchronized at the viewer computing unit using the closed captioning script which accompanies the primary content.

In the implementation, client device 106 can use the closed captioning script in a parsing application to parse the closed captioning script. The parsed closed captioning script is used with the input data items seen in FIG. 1 to find matches with respect to one or more search parameters in an active interest assessment process. The active interest assessment process allows a viewer to use a user interface to enter input data items to request programming that contains particular words or phrases. These words or phrases can be used to find matches in a closed captioning text stream in a television program.

A recommendation processor can receive closed captioning text as well as the request for particular words and phrases. The recommendation processor can then recognize a match between the requested words or phrases and any words or phrases that are extracted from the closed captioning text. Upon the location of a match, the closed captioning text in which such a match occurs can be counted and optionally weighted accordingly. As such, words or phrases that the viewer had specifically identified can receive emphasized (e.g. weighted) counting. The weighting result can be compared to a particular threshold of interest to the viewer, such as making a requirement that a predetermined percentage of a program must contain matches in order to be deemed likely to be of interest to a viewer. The steps of the recommendation engine can include extracting words and phrases from a closed captioning text in video signal, matching the actively specified words and phrases against closed captioning text, and then notifying the viewer when a particular pattern of the desirable words and phrases have been reached in a particular television program. The particular pattern can be an assessment of the numerical ranking of words and phrases. Moreover, the ranking can be made based upon a predetermined algorithm for weighting certain types of matches of the one or more search parameters. The highest ranked matches are used to determine content associated with the same that is likely to be of interest to the viewer.

The parsing application examines the closed captioning text words and sequential groupings of words or characters (i.e. phrases) to locate matches of words and phrases that were specified by a viewer. Each match of a word of phrase can be counted and the count can be kept in a counting buffer for each program being monitored. The counted number of matched for each word and phrase is ranking. The highest ranked words and phrases are used to determine programming likely to be of interest to the viewer.

In another implementation, a closed captioning script is monitored as described above, where the parsing application parses the closed captioning script of programming content that the viewer is actually viewing or that is being recorded. The parsing is used to find matches with respect to one or more search parameters in a passive interest assessment process. In the passive interest assessment process, the words and phrases in the closed captioning text of programs that are viewed or recorded are used to build a passive list. The passive list is used to keeping track of what the viewer has been viewing or recording. The passive list can be kept in a table in a memory device, such as a hard drive, associated with client device 106, which memory device can be either locally and/or remotely kept. The table contains an accumulation of those words and/or phrases occurring in programming that is viewed or recorded based upon a monitoring of the closed captioning text thereof. In passive list reflects the viewer's interests by the incidence of highly occurring and/or phrases. When similar television programming is detected by client device 106, in theory, there will be frequent matches between high ranking words in the passive list and the closed captioning text of the television programming. When a predetermined match threshold is exceeded, the viewer can be given notice that programming likely to be of interest has been located. This predetermined match threshold can be statistically proximal percentage of words and/or phrases occurring therein, which can be designed by a viewer or made available by a service provider to client device 106.

In practice an extractor of closed captioning text need not extract all closed captioning text in a television program.

Rather, the extractor can take samples of incoming signals and identify words or phrases that match the current passive list. In a sampling process for client device 106, each tuner can be allocated to each of channel of interest. Samples are periodically made of those channels so as to continuously and sequentially sample each channel such that the closed captioning text of each of multiple channels can be sampled. If words or phrases in any sample have a high occurrence and correspond to a list of desirable words and phrases, the signal on that channel will be saved in a video recording, such as where a certain threshold has been exceeded as specified by viewer input.

Where a program on a channel is being monitored by a tuner, a separate text accumulation file must be kept for each monitored program on the channel. The entire program to which a tuner is tuned need not be recorded, but only a portion thereof. In a sampling algorithm, the samples taken can be sufficient to determine whether the entire program might be representative of the interests of the viewer. As such, several tuners can monitor an even greater number of channels to locate programming that is likely to be of interest to the viewer. As soon as a predefined threshold is exceeded, the tuner can stop the word and phrase counting and the corresponding program can be recorded. As such, overhead for counting will henceforth be avoided once the predetermined threshold has been exceeded. Additionally, if a certain percentage of a program has passed, as derived from known data about the program, and the predetermined threshold has not yet been exceeded, then client device 106 can be configured to stop counting words and phrases and any buffer used for storage can purged because too few words or phrases of interest to the viewer have been found in the program. Thus, the resources of client device 106 can be freed up.

A counting buffer can be used so that those words or phrases that occur rarely would be removed or dropped from the passive list by those words or phrases that are occurring more frequently in the closed captioning text of a program being monitored. The new words or phrases or more recent words or phrases are used to replace those in the passive list that are dropped so that the buffer will most likely contain the latest and most relevant words and phrases to the viewer. It is also possible the viewer may display all or a part of the contents of the counting buffer in respond to a request for same. As the counting buffer fills, terms that were acquired a longer period of time ago or words or phrases that have a lower priority than words or phrases of higher priority or more recent priority are dropped.

A disk drive of client device 106 can be used as a pause buffer for storage of audio and video signals. This pause buffer may be required to be quite large because video signals can consume a large amount of storage. The pause buffer on the hard drive should be large enough so that when it is determined that a program has a high incidence of words and phrases in the counting buffer, then the pause buffer can record the program to a more permanent space so that the beginning of the program is also included in the recording. Thus, the pause buffer may be large enough to record a half hour, one hour, or two hour television program. Thus, a list is available for words and phrases that occur highly in programs that the viewer has been viewing in the passive list.

In one implementation, client device 106 may be used to monitor one or more channels on broadcast television while it is otherwise unattended or not in use by a viewer. As such, processor cycles of client device 106 that would otherwise not be used can be used to monitor channels and the closed captioning text within a signal being broadcast on the respective channels. When a particular pattern of words or phrases that are known to be of interest to the viewer occur in content programming, either through active or passive interest assessment processes, the viewer can be notified as described above or the program can be automatically recorded either remotely or locally for future viewing by the viewer. The criteria by which the program will be recorded can be made dependent upon viewer specified parameters of interest. Alternatively, a purely passive interest assessment process can be used in order to make recordings of programs most likely to be desirable to be viewed by the viewer. The later alternative may be desirable where a viewer is not likely to view live programming, but prefers pre-record programming, which preference can be determined by client device 106 with respect to historical viewer viewing patterns.

In the event that the viewer watches some of a program but not all of the program, and the length of the program that is watched by the viewer is less than a predetermined threshold, then the words and phrases accumulated for that brief period of television viewing might be purged such those words and phrases in the program were not likely to be of interest to the viewer. Alternatively, if the viewer spends an extended time watching a particular program or programs, then the words and phrases that occur highly or rank highest in occurrence in that programming could be weighted higher as indicating a higher interest of the viewer in that type of programming as evidenced by the closed captioning text data words and phrases occurrences.

Both of the passive list and the active list be used together to be able to find programming of interest to the view. The viewer may also be permitted to specify one or the other list that is to be used in any future identification of programming likely to be of interest. The designated list or lists can then be used by client device 106 to locate and/or record content likely to be of interest to the viewer.

The active and/or passive interest assessment processes can be used to determine programming content likely to be of interest to the viewer. The results of the assessment can be communicated to the viewer by a diagnostic output, such as by display on a television screen, electronic mail (email), telephone message, etc. Once the viewer receives notice as to the programming content likely to be of interest to the viewer, the viewer can provide an instruction to the local client device to display or record the content. In absence of such instruction from the viewer, the client device can automatically record the programming content for later review and/or viewing by the viewer.

Referring now to display lines 12-26 on FIG. 1, display line 12 permits a viewer to use an input device, described elsewhere herein, to make input of those words and phrases that client device 106 should track as received in a closed captioning text in conventional broadcast television signals carried on a channel that is received by client device 106 and/or in a previously recorded video recording that is played back by client device 106. Display line 12 on television 132 of FIG. 1 displays input from a viewer for which client device 106 will monitor the closed captioned text of content programming that client device 106 is capable of receiving. Client device 106 will attempt to locate in the closed captioning text the word number 911 or the word "nine eleven". Once located, the match will be counted. Also to be counted are matches in the closed captioning text to the words and/or phases KNITTING, DOT NET, CLYDESDALE, BASS FISH OR BASS FISHING, and X BOX, as indicated in display line 12. Tabulation will be made for the number of matches of words and phases in display line 12 that were found in the closed captioning text of each decoded segment of content programming. It may be desirable that words or phrases that were specified by the viewer, such as by display line 12 seen in FIG. 1, be counted with a weight greater that a count of one (1), such as 1.75, 3.0, or 5.5. This weighting will place a greater emphasis on corresponding television programs in which a match to actively specified word or phrase occurred.

With respect to a passive interest assessment process, it may be desired that the only words that are counted in a passive interest list are nouns, proper nouns, or verbs. This will reduce the counting overhead of the passive interest assessment process. Alternatively, all words could be counted with these types of words receiving a weighted count, if desired, for each occurrence of the same in the closed captioning text.

The phrase "BASS FISH$" in display line 12 contains the wild card "$", which can be interpreted by the parsing application to mean that matched words and phrases will be counted regardless of their respective suffix. As such, the term FISH, FISHES and FISHING would be counted by the word counting aspect of the parsing application. It is also contemplated that display line 12 would permit Boolean search queries using multiple terms. As such, Boolean operators AND, OR, or AND NOT could be used in combining words and phrases to specify input to display line 12 on television 132 of FIG. 1.

The closed captioning text typically lacks punctuation, such as case, commas, and quotes. As such, the format of words and phrases display line 12 can be all in the upper case. Moreover, the parsing application can account for or ignore speaker cues that are typically provided in the closed captioning text.

Display line 14 can be used to allow a viewer to input digital codes that are representative of television programming that will occur in the future. These codes, such as VCR Plus™ codes, allow a viewer to designate a time/date range of a programming content that will be broadcast on a particular broadcast channel. Client device 106 will then tune to the broadcast program at the designed date and time in order to count words and phrases that appear in the closed captioning text. Each program for which a code is designed will be treated as such. Where more than or program occurs at the same time, and fewer tuners are associated with client device 106 that simultaneously occurring programs, client device 106 can use a sampling algorithm in order to monitor the respective closed captioning text of simultaneously programs.

Words and phrases occurring in programs represented by the codes in display line 14 can be weighted so as to emphasize the same. Thus, if a VCR Plus™ code 10925 of display line 14 had a high occurrence for the phrases "Steve Irwin" and "Crocodile Hunter", then other content programming would be examined in order to locate in the same a high occurrence of these phrases. When so located, the corresponding content programming could be identified to the viewer by client device 106 as being of likely interest.

Display line 16 shows a New York Times™ new word list and a toggle input field indicating that the viewer would like the word list to be used in selecting television programs that they would like to view. The New York Times™ new word list can be retrieved from an Internet connection linking client device 106 through an interconnected network to a website that contains this particular lists of words, such as that made available by the New York Times™ newspaper of New York, N.Y., USA. This list includes words and phrases have appeared in the New York Times™ newspaper during the last 12 months but that have not appeared during the previous 12 months. As such, the list can be used to identify patterns in media as they occur in the closed captioning text of content programming.

Display line 18 is similar to display line 16 in that a list of words of phrases is retrieved from an Internet website. Here, display line 18 refers to words and phrases representative of recommended movies or actors or situations (e.g. plots) as proposed by a notable movie critic. As such, the words and phrases in this particular list will be compared to closed captioning text in television programs to determine those programs that have high match rankings. Of course, other word lists found at a site on an Internet resource can also be used, such as a list that is maintain by a viewer and/or an association of viewers.

Display line 20 allows a viewer to specify stock trading symbols of publicly traded corporations (e.g. juridical entities) for which the viewer is interested in seeing news items or television programming relating thereto. Here, an Internet connection could be used to retrieve the full corporate name, abbreviations, or nicknames for the respective corporation(s) based on the stock symbol. Then, the closed captioning text of television programming could be tracked to determine high occurrences in the closed captioning text of the references to the corporation.

Display line 22 allows a viewer to input an address, such as one or more telephone numbers and/or one or more email addresses. An Internet web hosting service can be used to place a telephone call and/or send an email to the viewer at the specified one or more addresses. This message can notify the viewer that content programming likely of interest is currently being broadcast on one or more channels, will be shown in the future at a particular date and time, and/or will be recorded for the viewer for later viewing. Here, an electronic programming guide (EPG) made available to client device 106 can be analyzed to locate future content programming likely to be of interest to the viewer.

The EPG can generally be used to the locate the start and stop time and date of broadcast content programming for use by client device 106, such as for starting and stopping an automatic video recording of a broadcast television program. For instance, display line 24 allows the viewer to input the number days ahead of the current system time and date of client device 106 that client device 106 would search ahead in television programming summary information in the EPG data. EPG data provides summary information about programming that is to occur in the future, such as the actors or actresses, the plot, a rating code, etc. This information may be insufficient for a viewer to determine whether or not they have a sufficient interest in the program that will be shown. Nevertheless, this information can be useful, though is often subject to change, in assessing whether to record a program that will be shown or to be present while the programming is being shown. A search of EPG data within the specified number of days forward would attempt to locate matching words and phrases, in either an active and/or a passive interest assessment process, so that future programming that the viewer might be interested in recording and/or watching could be noticed ahead of time. In the event that this search in the EPG by client device 106 locates future programming likely to be of interest, an option may be provided by client device 106, or by another service, to automatically make a video recording of the broadcast television program at the corresponding start and stop times on the date designated in the EPG. Client device 106 can then generate start and stop event tokens. Event tokens provide start and stop times corresponding to television programming likely to be of interest to a particular viewer. These event tokens provide instructions sufficient to start and stop the recording of an identified program on a video recorder. A buffer in communication with client device 106, which can be either local or remote, can be used by client device 106 to record all or a portion of the identified program so that its will be stored for the viewer's future viewing.

In summary, with respect to an active interest assessment process, FIG. 1 provides display lines 12, 16, 18, 20, and 26. With respect to a passive interest assessment process, FIG. 1 provides lines 14 and 24.

In the event that the viewer wishes to select a duration for recording programs other than a duration which corresponds to the start and stop time of a program as specified in EPG data made available to client device 106 through a service, then the viewer can specify a time frame around which words and phrases appear in closed captioning text for which the viewer has an interest. Accordingly, a broadcast news segment or a portion of a documentary can be recorded, as opposed to the entire program specified by EPG data. A viewer can use client device 106 to specify a time duration threshold around the occurrence of the words and phrases in the closed captioning text so that only that portion within the specified threshold would be recorded. For this function, the viewer could also specify those channels that they do not wish to have recorded. For instance, a viewer may not wish to record at any time any information that occurs on a television channel that strictly serves to sell items to the public. The viewer may also wish to avoid any political programming, such as is found on the CSPAN™ Network broadcasts.

Display line 24 shows a rating control that can be compared to programming ratings found in the EPG. Accordingly, the viewer can block the viewing and/or recording of certain television programs based upon the respective ratings given in the EPG, regardless of the results of the active and/or passive interest assessment processes. Other such blocking devices are contemplated that can be used to override the active and/or passive interest assessment processes, such as programming that occurs on particular channels which may or may not be within a certain time and/or date range. A table of such viewer prohibitions can be kept in memory storage of client device 106 for comparison to television broadcasts and/or previously recorded content programming so as to be able to match the same to viewer specified viewing and/or recording prohibitions.

Display line 26 allows a viewer to specify words and phrases found in closed captioning text that client device 106 can use to block viewing and/or recording. These words and/or phrases can be in a phrase and/or word omission list that can be kept in memory storage of client device 106. Additionally, display line 26 allows the viewer to express by a numerical place on the list that would represent exceptions to the stored items in the list. These exceptions would allow programming to be viewed or recorded when an exception was noted to the designed list entries. In practice, a pause buffer can be allocated in a memory device, such as a hard rive, associated with client device 106, which memory device can be either locally and/or remotely kept. The pause buffer records all or a portion of a broadcast television program. By way of example, a tuner of client device 106 can record to the pause buffer by sending the received broadcast signal first to the pause buffer, then later (e.g. 5 seconds) to the television 132 for display. Every tuner in client device 106 can be used to record a signal of a different channel to a pause buffer. Alternatively, other pause buffers can be used, such as a pause buffer at one or more headends, or at other client devices. Then, when ever a word or phrase on the word omission list is encountered, the video recording would be flagged so that a playback of that portion would not be seen by the viewer. Alternatively, the viewing and/or recording of the entire program can be skipped, or the viewing and/or recording can be dubbed so as to blank the audio and/or the video components thereof, including the closed captioning text. As such, the demand input from display line 26 can be used so that viewers viewing a playback by client device 106 are not exposed to itemized words and/or phrases on the word omission list and/or to those images associated therewith. Word omission list can be provided by a software provider for client device 106, or by a service relating thereto. Client device 106 can provide a user interface such that the word omission list and exceptions thereto, can be maintained by the viewer for those words and/or phrases that the viewer does not wish to be part of their entertainment experience. To maintain the list, an input device would be available to the viewer to enter into a display, such as that seen in the viewer interface of FIG. 1 on television 132, whereby the list can be constantly maintained, reviewed, and updated upon demand.

Some words or phases occur so commonly that they need not be counted. As such, these words and phrases lose their usefulness as search terms in locate broadcast content likely to be of interest to a viewer. By way of example, the following words and phrases are suggested in Table 1 that a word and phrase counter might avoid counting.

TABLE 1

| | | | |
|---|---|---|---|
| A | HAD | SOME | WERE |
| ACCORDANCE | HAS | THAN | WHAT |
| ACCORDING | HAVE | THAT | WHEN |
| ALL | HAVING | THE | WHERE |
| ALSO | HEREIN | THEIR | WHICH |
| AN | IF | THEN | WHILE |
| AND | IN | THERE | WHO |
| ANOTHER | INTO | THEREBY | WILL |
| ARE | IS | THEREFORE | WITH |
| AS | IT | THEREOF | WOULD |
| AT | ITS | THERETO | HEY |
| BE | NOT | THESE | UH |
| BECAUSE | NOW | THEY | UM |
| BEEN | OF | THIS | AH |
| BEING | ON | THOSE | "YOU KNOW" |
| BY | ONTO | THUS | DUH |
| COULD | OR | TO | HMM |
| BY | OTHER | USE | HUH |
| FOR | SINCE | WAS | "YA KNOW" |
| FROM | | | |

Table 2 gives an example of a table that can be maintained by a word and phrase counter associated with client device 106, which can be maintained locally and/or remotely. Each monitored content programming on a broadcast channel or on a recording can have any matches found in its closed captioning text streams ranked according to the information provided by the viewer as seen in FIG. 1. Each entry in Table 2 represents a particular program that is currently airing or that has been previously recorded and is available for viewing by the viewer. Additionally, Table 2 shows seven (7) specific television programs that are top ranked for matched by client device 106 as a result of monitoring of the closed captioning text thereof. Matches to an active list and matches to a passive list, as was described above, show the ranking from "1" in the first place to "7" in the seventh place. The passive list can be filtered based upon entries in Table 1, above. Moreover, the match rankings for the active and/or passive lists can be weighted by a predetermined weighting algorithm as suggested above.

TABLE 2

| Ranking | Active List | Passive List |
| --- | --- | --- |
| 1 | 911 | 911 |
| 2 | NINE ELEVEN | CROCHET |
| 3 | KNITTING | AFGHANISTAN |
| 4 | DOT NET | HORSE |
| 5 | CLYDESDALE | FLY FISHING |
| 6 | BASS FISH$ | COMPUTER GAME |
| 7 | X BOX | TROOPS |

Tables A, B, and C, seen below, show the results of a comparison of Channels A, B, and C being monitored by one or more tuners, respectively, in client device 106.

TABLE A

Channel A: Television Program of 60 Minutes Duration as Per EPG Data

| Period | Active Hits | Passive Hits | Ave Active | Ave Passive | Ttl Ave. |
| --- | --- | --- | --- | --- | --- |
| 1 | 20 | 6 | 20 | 6 | 26 |
| 2 | 11 | 9 | 15.5 | 7.5 | 23 |
| 3 | 4 | 18 | 11.6 | 11 | 22.7 |

TABLE B

Channel B: Television Program of 30 Minutes Duration as Per EPG Data

| Period | Active Hits | Passive Hits | Ave. Active | Ave. Passive | Ttl Ave. |
| --- | --- | --- | --- | --- | --- |
| 1 | 0 | 0 | 0 | 0 | 0 |
| 2 | 2 | 1 | 2 | 1 | 1.5 |

TABLE C

Channel C: Television Program of 120 Minutes Duration as Per EPG Data

| Period | Active Hits | Passive Hits | Ave. Active | Ave. Passive | Ttl Ave. |
| --- | --- | --- | --- | --- | --- |
| 1 | 3 | 10 | 3 | 10 | 13 |
| 2 | 18 | 22 | 11.5 | 16 | 26.5 |
| 3 | 36 | 9 | 19 | 13.7 | 32.7 |
| 4 | 10 | 10 | 16.75 | 12.75 | 29.5 |
| 5 | 10 | 10 | 15.4 | 12.2 | 27.6 |

Each Table A-C shows the length of the television program being monitored as determined from EPG data made available to client device 106. Also seen in each Table A-C is a number of periods that were monitored in a sampling algorithm, a number of matches in the closed captioning text of the monitored program with an active list, the number of matches between the passive list and the closed captioning text of the program being monitored, the average matches (hits) with respect to the active list for each period, the average matches (hits) with respect to the passive list for each period, and the total average hits for that period. Accordingly, as seen Table A, Channel A is being monitored for a 60 minute program. During the first period 20 matches were found with the active list and 6 matches were found with the passive list. An average of 20 hits occurred for period one for the active list. There were an average of 6 hits for the passive list and total average matches were 26 for the period. The second period in Table A averages together the first and second periods. There were 11 active list matches, 9 passive list matches, a total of 15½ average matches with the active list, 7½ average matches with the passive list, and an average total of 23 matches overall between the first and second periods. Similarly, the third period found that there were 4 hits for the active list and 18 hits for the passive list, thus giving an average hit of 22.7 hits. Tables B and C present similar results for 30 and 120 minute television programs, respectively. Any of the results given in Tables A-C can be used in ranking the content programming represented therein in a determination of viewing that is likely to be of interest to the viewer.

Tables A-C can be used in a variety of manners. By way of example, in Table C, after period 2 it is noted that there is an average of 26.5 active and passive hits for the two monitored periods for Channel C. A threshold might be set, such as an average of 15 hits, so that the Channel C would cease to be monitored and would be recorded instead as soon as the accumulation of hits exceeded 15. Similarly, Channel B in Table B shows that after the second period less than 15 total average hits have been recorded. As such, Channel B would cease to be monitored and the tuner would be freed up to go monitor another channel.

The active and/or passive lists can be further enhanced. For example, actively or passively specified nouns and/or verbs can be compared to a thesaurus, which may also be kept in a memory storage location of client device 106, where synonyms of words on the active list and/or the passive list can be added automatically to the respective lists. As such, television programming that expresses the subject matter in synonymous terms, other than in those terms used in either the active or passive lists, can be used to notify the viewer of programming that the viewer will likely want to watch.

When a word and phrase pattern of programs watched matches a word and phrase pattern of programming on a particular channel, then the viewer can be notified. This notification can take place, by way of example and not by way of limitation, within the environment seen in FIG. 2 which is discussed below. Specifically, display line 224 is used in FIG. 2 to provide such notice to a viewer. The viewer can then use one of the input devices 204-208 to highlight one of the displayed programs in display line 224. Then, the input device can be used by the viewer to cause client device 106 to immediately display the corresponding content programming of the highlighted program. Alternatively, the viewer can use one of the input devices 204-208 to go to a scrolling display seen in FIG. 3, as described below.

Display line 224 seen on television 132 indicates that programming is available to the viewer that, based upon a predetermined algorithm, may be of interest to the viewer. Display line 224 shows that Channels 10, 127, and 254 are currently showing programming that may be of interest to the viewer. Additionally, display line 224 shows several letters, each of which represents a different video recording that was previously made by client device 106 that may also be of interest to the viewer. Previous video recordings A, B, J, and W are seen in display line 224. Here, the viewer can retrieve digital video recordings A, B, J, and W, which may be stored in client device 106 or in content distribution system 104, seen in FIG. 4 and discussed below. Alternatively, both content distribution system 104 and client device 106 can store some or all of previously recorded programming for the viewer.

The notification to the viewer of located content programming of interest can be performed other than as seen in display line 224. For instance, client device 106 can have an awareness function that can determine when the viewer is watching television as well as how much of viewed programs that the viewer actually watches. If the viewer is currently watching television, then the television can output display line 224 to indicate programs that are currently available on specified channels that are likely to be of interest. Alternatively, or in addition thereto, client device 106 can issued audible and/or visual diagnostic using output device 203 on television 32, so as to provide such notice to the viewer.

In the event the viewer is not watching television 132, client device 106 can send a notification message to an address, such as a telephone number or an email address, as was described above with respect to the addresses input by a viewer to display line 22 seen in FIG. 1. To do so, client device 106 can include a device to access an interconnected network so as to transmit the notification message to the specified address on the interconnected network with which the device is in communication. Any of input devices 204-208 can be used to receive the address(es) on the interconnected network from a viewer. An application can be executed in client device 106 to form and address the notification message. The content of the notification message would include data relative to the occurrence of textual data matching one or more search parameters that were based on the interests of the viewer, as well as the title, date and time range of the program as determined from EPG data. Client device 106 can also include a device to transmit, for each of the matches, the addressed notification message to the address(es) on the interconnected network. As such, the interconnected network and the address (es) thereon can be a telephone network and a telephone number on the telephone network, or an email server and an email address at the email sever.

If the viewer does not respond within a predetermined time period to the email or to the telephone call by replying to the email and/or by placing a telephone message to a predetermined telephone number, then client device 106 can be configured to automatically make a recording of the program(s) contained in the notice to the viewer. Alternatively, and in respect to a notice initiated by client device 106 or a service related thereto, the viewer could also be permitted to configure client device 106 to permit other choices, such as the choice to avoid making a recording of the particular show, and/or to request additional information available about the particular show (e.g. to provide further notice containing information made available on EPG data).

Figure 2:
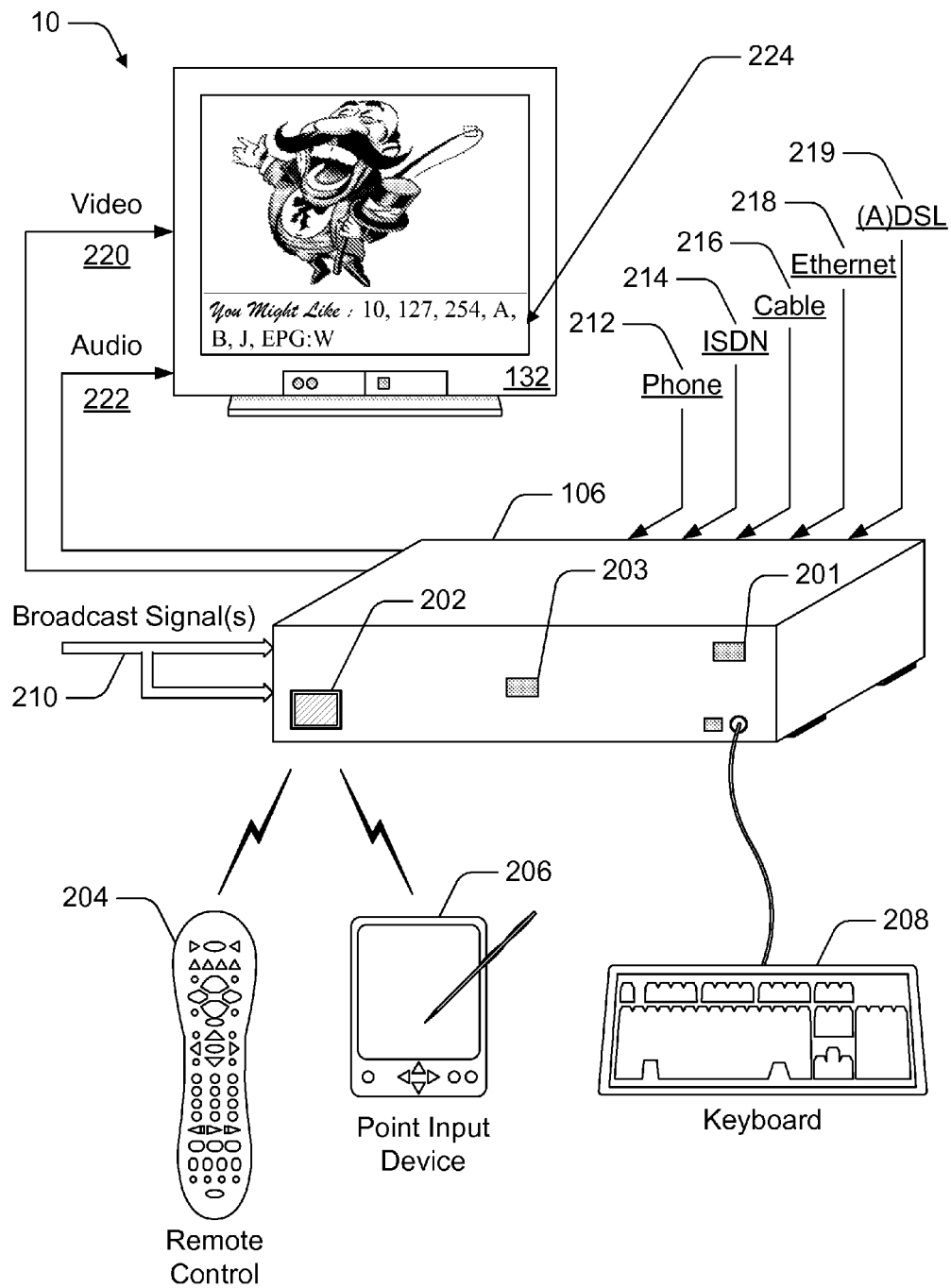
FIG. 2 illustrates of the client device of FIG. 1, including various input devices that interact with the client device, where the television displays choices to the viewer of television programming content, each being selectable by the viewer, that have been determined likely to be of interest to the viewer based upon the input receive in the environment of FIG. 1.

While FIG. 2 shows display line 224 at the bottom of the screen of television 132, this notice of the viewer can also be displayed in other locations on the screen, which locations can be made selectable by the viewer. As such, a selected site on the display screen can be made so that it will not block the current programming offered on the screen through another channel. For instance, the viewer might select a placement where the closed captioning text of a program most likely would occur, or the viewer may select a similar border position on the display screen. The viewer could also select a notice position to be placed in a split screen or a "picture in a picture" (PIP) as the desired location for displaying the notice.

While aspects of the described methods, program products, and systems can be used in any of these systems and for any types of client devices, they are described in the context of the following exemplary environment.

Client device 106 includes a wireless receiving port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 is coupled to communicate with the client device 106. In alternate embodiments, remote control device 204, handheld device 206, and/or keyboard 208 may use an RF communication link or other mode of transmission to communicate with client device 106.

Client device 106 receives one or more broadcast signals 210 from one or more broadcast sources, such as from a satellite or from a broadcast network. Client device 106 includes hardware and/or software for receiving and decoding broadcast signal(s) 210, such as an NTSC, PAL, SECAM or other TV system video signal. Broadcast signal(s) 210 can be multiplexed to be carried on a multiplexed channel. One signal carries broadcast media that is received by client devices 106(1) through 106(N) for display, respectively, upon televisions 132(1) through 132(N), as seen in FIG. 2.

Client device 106 also includes hardware and/or software for providing the viewer with a graphical user interface (GUI) that can be displayed upon television 132. The GUI can be used by the viewer for a variety of purposes. The viewer can use the GUI, for example, to access various network services as is typical for interactive television applications, configure the client device 106, and perform other functions as discussed below.

Client device 106 is capable of communicating with other devices via one or more connections including a conventional telephone link 212, an ISDN link 214, a cable link 216, an Ethernet link 218, and a DSL/ADSL link 219. Client device 106 may use any one or more of the various communication links 212-219 at a particular instant to communicate with any number of other devices. In the case where client device 106 uses communication links 212-219 for an interactive television application, these links facilitate bi-directional communications between a viewer of a television program and, for example, the broadcaster or developer of the television program.

Client device 106 generates video signal(s) 220 and audio signal(s) 222, both of which are communicated to television 132. The video signals and audio signals can be communicated from client device 106 to television 132 via an RF (radio frequency) link, S-video link, composite video link, component video link, or other communication link. As seen in FIG. 14, device 203 of client device 106 can include one or more lights or other indicators identifying its current status. By way of example, when device 203 detects the presence of content likely to be of interest to a viewer, one or more lights or other indicators can emit one or more different and characteristic diagnostics as to the identified content. Additionally, the client device may include one or more control buttons, switches, or other selectable controls for controlling operation of the device.

Figure 3:
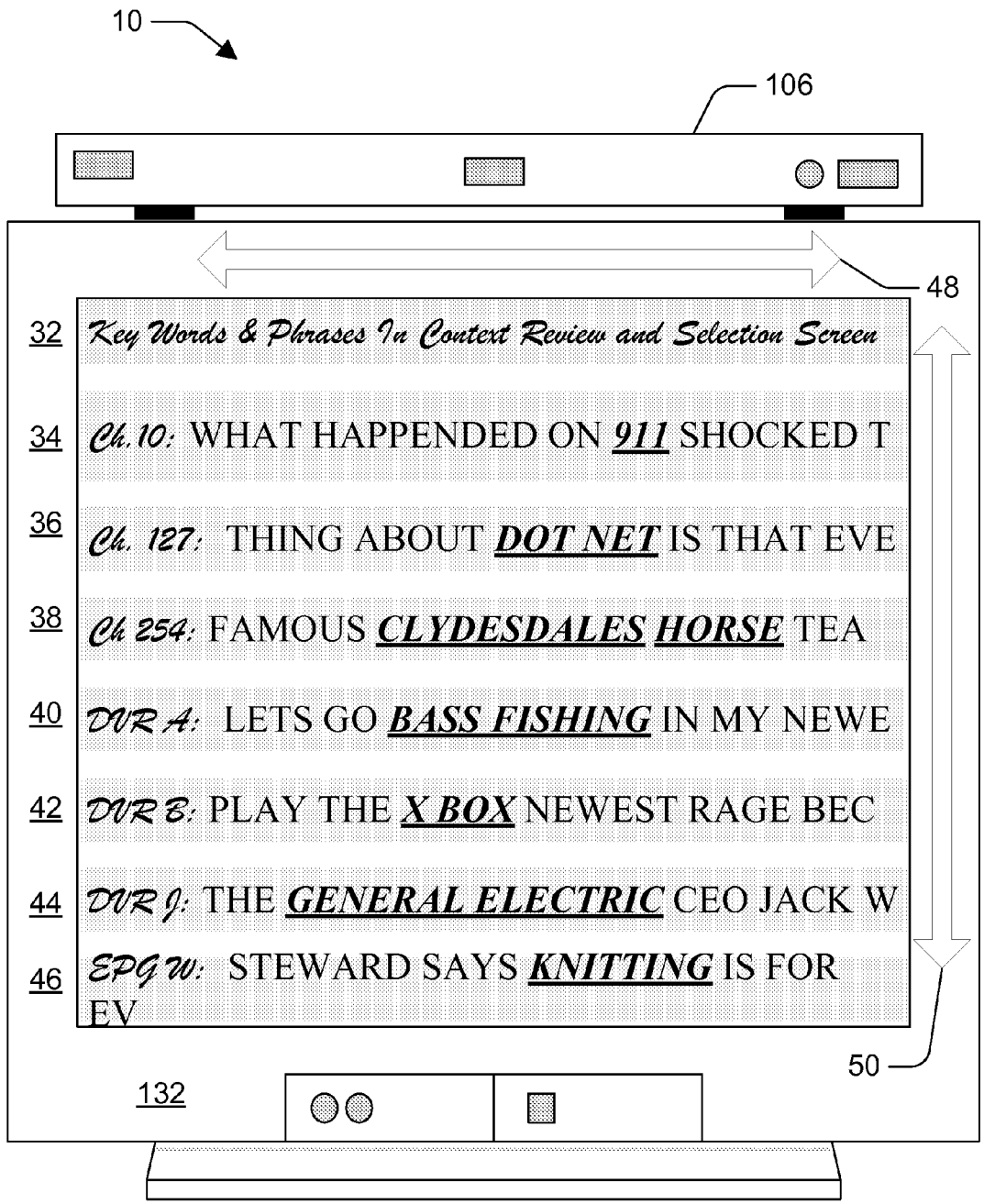
FIG. 3 illustrates the environment seen in FIG. 2 in which the client device outputs, and the television displays, a scrollable output of partial portions of several closed captioning streams of textual data, each including occurrences of textual data that match one or more search parameters based upon the input receive in the environment of FIG. 1, where each partial portion identifies the source of the content, and where the viewer can select the identified source for viewing the content thereof.

FIG. 3 shows the result of a matching algorithm that searches closed captioning streams of textual data for occurrences of textual data matching one or more search parameters defined in an active and/or passive interest assessment process, as derived from display lines 12-20 and 24-26 on television 132 of FIG. 1. Fields 34-46 shown in FIG. 3 illustrate a sequential output of characters to television 132 of partial portions of the closed captioning stream of textual data. Each character string includes each occurrence of textual data matching the one or more search parameters. In FIG. 3, display line 32 titles the display as being the "Key Words & Phrases in Context Review and Selection Screen". Display lines 34-38 show matched words and phases corresponding to display lines 12-20 and 24-26 on television 132 of FIG. 1. Display lines 34-38 show the matches in the closed captioning text of channels 10, 127, and 254. Similarly, display lines 40-44 show the matches in the closed captioning text of pre-recorded programs in video recordings A, B, and J. Also shown in FIG. 3 is display line 46 which shows matches with a program described in summary information found in EPG data.

The output seen in FIG. 3 can be scrolled by use of input devices 204-208 seen in FIG. 2 so as to scroll the display in the directions indicate by arrows 48 and 50 seen in FIG. 3. Arrow 48 allows the display on television 132 to be scrolled horizontally, or chronologically forwards and backwards, so as to show the occurrences of matches in the closed captioning script. Arrow 50 allows the display on television 132 to be scrolled vertically up and down in order to see each channel, previously recorded program, and EPG data program, where each display line 34-46 shows the respective match occurrences in the closed captioning data thereof.

In practice, the display seen in FIG. 3 can be a television viewing screen that is desirable in assisting a viewer to more personally assess their level of interest prior to viewing a particular program that client device 106 has determined likely to be of interest. The display of FIG. 3, and others of similar concept, allows a viewer to continuously watch for signs of text occurrences that the viewer might find interesting. This display can be compared to twenty-four hours news programming broadcasts carried by satellite and cable systems (e.g. CNN Headline News™ service). In these types of programming, a single text line of display appears below an on-screen announcer or other video content. This single line of display presents a textual report of news such as headlines, stock symbols and current quotes therefore, sports competition scores, etc. In comparison, the concepts illustrated in FIG. 3 present multiple lines of display each of which is limited to previously identified, and constantly updated, words and phrases likely to be of interest to the viewer. The presentation of adjacent words to the identified words and phrases, the later of which can appear in emphasis (e.g. bold, underlined, italics, etc.), provides the viewer with ready identifiers of both the words and phrases and the context in which they appear. As such, FIG. 3 shows key words in context.

A viewer can use any of input devices 204-208 to select a channel or pre-recorded program displayed in display lines 34-44 so as to immediately display the content corresponding to the displayed programming. Alternatively, the viewer select display line 46, which appears in FIG. 3 has an EPG program. Such a selection cause client device 106 to generate corresponding start and stop event tokens such that client device 106 will be configured to make a video record of the corresponding program when it is broadcast in accordance with the EPG data received client device 106.

Exemplary Environment

Figure 4:
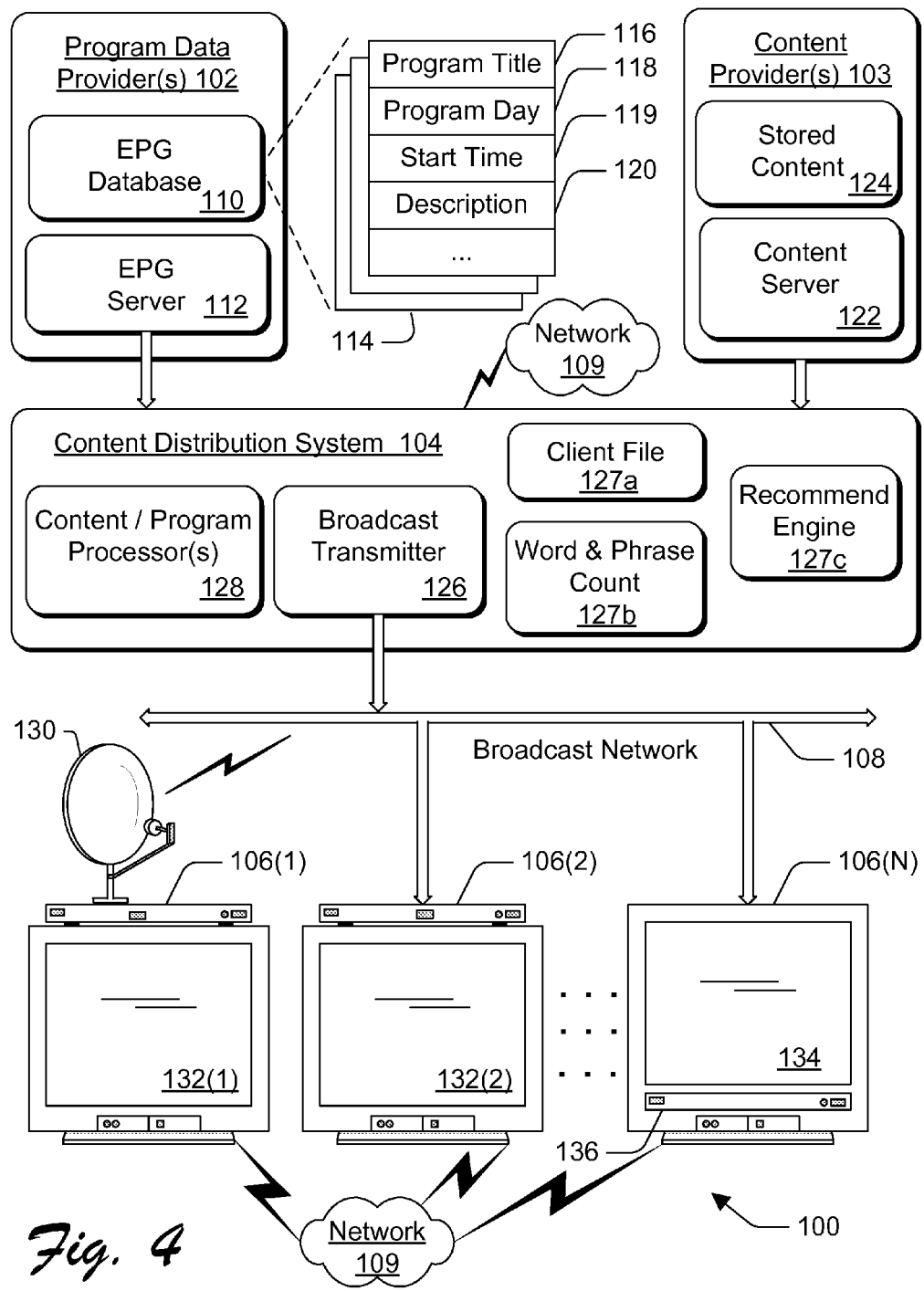
FIG. 4 illustrates an exemplary environment in which the program products, systems, and methods described herein may be implemented.

FIG. 4 illustrates an exemplary environment 100 in which the methods, programs, and systems described herein may be implemented. Exemplary environment 100 is a television entertainment system that facilitates distribution of content and EPG data to multiple viewers. The environment 100 includes one or more program data providers 102, one or more content providers 103, a content distribution system 104, and multiple client devices 106(1), 106(2), . . . , 106(N) coupled to the content distribution system 104 via a broadcast network 108. Also included in environment 100 are one or more network devices that communicate with EPG data provider(s) 102 through an interconnected network 109.

FIG. 4 shows content distributions system 104 as having components that include a client file 127a, a word and phrase count 127b, and a recommended engine module 127c. Client file 127a contains information about each viewer participating in the viewer preference service offered by a service, such as the cable television system or a satellite system, both of which offer video transmissions. In this case, the content distribution system 104 would perform the service of evaluating programming to determine whether or not a particular viewer identified in client file 127a would be likely to be interested in broadcast programming. Words and phrase count module 127b can be used to accumulate words and phrases and ongoing programming, as described above with respect to active and passive interest assessment processes. Accordingly, words and phrases found in closed captioning streams can be compared against pre-existing lists of words and phrases reflective of the respective interests of particular viewers. Accordingly, the list of words and phrase of interest to particular viewers can also be kept in word and phrase count module 127b. As such, viewers identified in client file 127a, which can be actual viewers subscribing to the service, correspond to those viewers for which certain words and phrases are being counted for accumulation assessment in word and phrase count module 127b. Recommendation engine module 127c can be used to keep thresholds and weights that can be applied for each particular viewer identified in client file 127a. These weights can be applied to actively and/or passively accumulated lists for the respective viewers so that plausible recommendations can be made as to those television programs that a viewer will most likely enjoy.

Active and/or passive interest assessment processes can be performed at client device 106, a client device 106 that is geographically remote from a viewer, and/or at content distribution system 104 (e.g. a headend). When matching criteria of a particular view is located, under an active and/or passive interest assessment process, a record of the corresponding digital video signals can be made by generating start and stop event tokens that will be used to record the corresponding program.

Recommendation engine module 127c may also be used in content distribution system 104 to notify a particular viewer having a record in client file module 127c of broadcast or recorded content that is likely to be of interest through a variety of notification means. One such means is to make a pre-recorded telephone call to the viewer specified by an address stored in client file module 127c. The address can be a telephone number or to a viewer specified email address. As such, recommendation engine module 127c can form message data that could be transmitted, for instance, through an email message on interconnected network 109 seen in FIG. 3, to an intended and pre-specified email address of the viewer. Alternatively, email could be sent to an operator that would make a telephone call to leave a message with the viewer, or to make a pre-recorded message that can be sent via content distribution system 109 through recommendation engine module 127c on interconnected network 109 to a telephone system for the viewer to review. As seen in FIG. 4, each client device 106(i) is in communication with interconnected network 109. Accordingly, it is contemplated that each client device 106 can receive and display email messages on television 132 for each respective client device 106.

When content distribution system 104 performs an active and/or passive interest assessment process for a particular viewer, the viewer can be furnished with a notice as described above. Moreover, content distribution system 104 can make a recording of a program likely to be of interest to the viewer's respective client device 106 upon demand for a fulfillment request for same. Such as notification and fulfillment process is analogous to a video on demand (VOD) process in that it is a potential option that all available channels can be monitored and selectively recorded based upon matching criteria to the interests of particular viewers. When the active and/or passive interest assessment processes are performed by content distribution system 104, a display signal can be broadcast over a broadcast network 108 to each client device 106(*i*). The output signal can include a VOD indicator that reveals the channel corresponding to each occurrence of textual data in the closed captioning stream thereof that matches one or more search parameters. Then, each client device 106(*i*) can, upon input of a selection by a viewer, output a display to a display device, such as a television receiver, in response to the receipt of the VOD indicator. The display that is output from the client device will be the programming content of the channel revealed in the VOD indicator output by content distribution system 104. Economies of scale can thus be realized when content distribution system 104 performs the notification and VOD fulfillment process for numerous viewers so as to distribute the cost thereof over viewers subscribing to such a service.

Program data provider 102 includes an EPG data base 110 and an EPG server 112. The EPG database 110 stores summary information about future programming including the date and times of television programming to be broadcast. Data in the EPG database 110 includes, for each television program, a program title 116, the program day 118, the start time 119, a summary description of the program 120 that can be used in an active and/or passive interest assessment process as described above with respect to input on display line 24 of FIG. 1, the duration or stop time (not shown), a parental rating system code that can be used with respect to input on display line 24 seen in FIG. 1, and other data relevant to the corresponding program. Data in EPG database 116 can be separately multiplexed into a data stream to be carried in a signal.

The EPG server 112 processes the EPG data prior to distribution. The processing may involve any number of techniques to reduce, modify, or enhance the EPG data. Such processes might include selection of encryption algorithms, content, content compression, text data and style data to be used to output text data from the client devices 106(*i*), and the like. The EPG server 112 controls distribution to client devices 106(*i*) from program data provider 102 to the content distribution system 104 using, for example, a file transfer protocol (FTP) over a TCP/IP network (e.g., Internet, UNIX, etc.). Alternatively, this distribution can be transmitted directly from a satellite to a local client satellite dish receiver for communication to a client device such as a local client set-top box.

Content provider 103 includes a content server 122 and stored content 124, such as movies, television programs, commercials, music, and similar audio and/or video content. Content provider 103, also known as a 'headend', does video insertion from a content source and an advertising source, and then places the content with insertions into a transmission link or a satellite uplink. Content server 122 controls distribution of the stored content 124 to the content distribution system 104. Additionally, content server 102 controls distribution of live content (e.g., content that was not previously stored, such as live feeds) and/or content stored at other locations to the content distribution system 104.

Content distribution system 104 contains a broadcast transmitter 126 and one or more content/program data processors 128. The one or more content/program data processors 128 combine content from content provider(s) 103 with EPG data from EPG data provider(s) 102. This combination of data is performed using by a multiplexing process prior to transmitting the content and EPG data across broadcast network 108 on a multiplexed channel. Broadcast transmitter 126 broadcasts signals, such as cable television signals, across broadcast network 108 on the multiplexed channel. Broadcast network 108 can include a cable television network, RF, microwave, satellite, and/or data network, such as the Internet, and may also include wired or wireless media using any broadcast format or broadcast protocol. Additionally, broadcast network 108 can be any type of network, using any type of network topology and any network communication protocol, and can be represented or otherwise implemented as a combination of two or more networks.

A particular content processor may encode, or otherwise process, the received content into a format that is understood by the multiple client devices 106(1), 106(2), . . . , 106(N) coupled to broadcast network 108. Although FIG. 4 shows a single program data provider 102, a single content provider 103, and a single content distribution system 104, environment 100 can include any number of program data providers and content providers coupled to any number of content distribution systems.

Content distribution system 104 is representative of a headend service that provides EPG data, as well as content, to multiple subscribers. Each content distribution system 104 may receive a slightly different version of the EPG data that takes into account different aspects of one or more intended multiplexed channels upon which a signal containing the EPG data will be broadcast. The EPG data server 112 creates different versions of the EPG data that include those multiplexed channels of relevance to respective headend services. Content distribution system 104 transmits the EPG data to each of the multiple client devices 106(1), 106(2), . . . , 106(N) that can receive the one or more multiplexed channels. In one implementation, for example, content distribution system 104 utilizes a carousel file system to repeatedly broadcast the EPG data over an out-of-band (OOB) channel to the client devices 106.

Client devices 106(*i*) can be implemented in a number of ways. For example, a client device 106(1) receives broadcast content from a satellite-based transmitter via a satellite dish 130. Client device 106(1) is also referred to as a local client set-top box or a satellite receiving device. Client device 106(1) is coupled to a television 132(1) for presenting the content received by the client device (e.g., audio data and video data), as well as a graphical user interface. A particular client device 106 can be coupled to any number of televisions 132 and/or similar devices that can be implemented to display or otherwise render content. Similarly, any number of client devices 106 can be coupled to a television 132.

Client device 106(2) is also coupled to receive broadcast content from broadcast network 108 and provide the received content to associated television 132(2). Client device 106(N) is an example of a combination television 134 and integrated local client set-top box 136. In this example, the various components and functionality of the local client set-top box are incorporated into the television, rather than using two separate devices. The local client set-top box incorporated into the television may receive broadcast signals via a satellite dish (similar to satellite dish 130) and/or via broadcast network 108. In alternate implementations, client devices 106 may receive broadcast signals via the Internet or any other broadcast medium.

Figure 5:
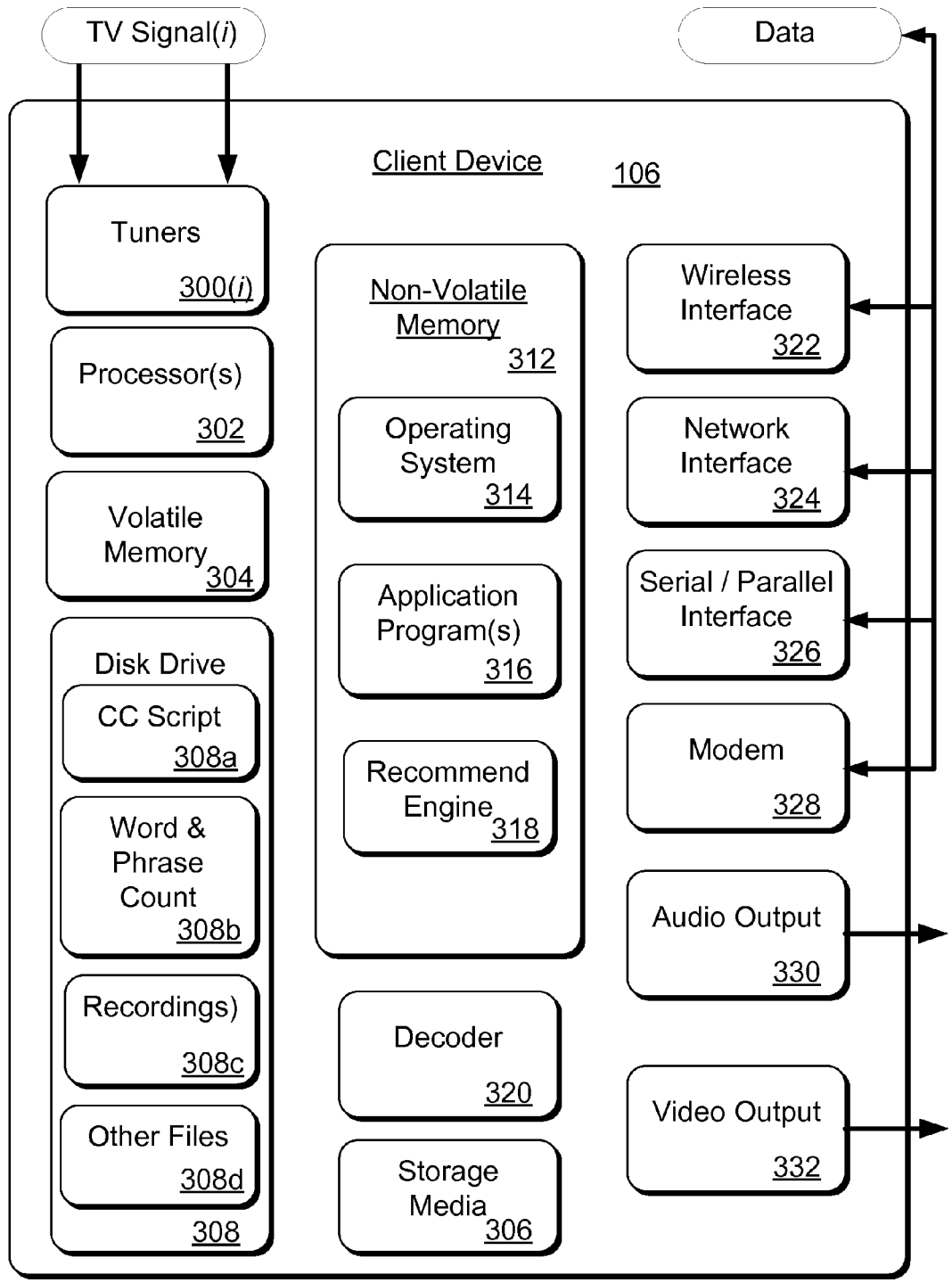
FIG. 5 is a block diagram that illustrates components of the example client device(s) shown in FIGS. 1-4.

FIG. 5 illustrates selected components of client device 106 shown in FIGS. 1-4. Client device 106 includes one or more tuners 300(*i*) representative of one or more in-band tuners that tune to various frequencies or multiplexed channels to receive television signals, as well as out-of-band tuners that can tune to one or more broadcast multiplexed channels to client devices 106(*i*). Client device 106 also includes one or more processors 302 and one or more memory components. Examples of possible memory components include a volatile memory 304, a disk drive 308, a mass storage component 306, and a non-volatile memory 312 (e.g., ROM, Flash, EPROM, EEPROM, etc.). Alternative implementations of client device 106 can include a range of processing and memory capabilities, and may include more or fewer types of memory components than those illustrated in FIG. 5. For example, full-resource clients can be implemented with substantial memory and processing resources, including the disk drive 308 to store content for replay by the viewer. Low-resource clients, however, may have limited processing and memory capabilities, such as a limited amount of volatile memory 304, no disk drive 308, and limited processing capabilities.

Processor(s) 302 process various instructions to control the operation of client device 106 and to communicate with other electronic and computing devices. The memory components (e.g., volatile memory 304, disk drive 308, storage media 306, and non-volatile memory 312) store various information and/or data such as content, electronic programming guide data, configuration information for client device 106, and/or graphical user interface information.

An operating system 314 and one or more application programs 316 may be stored in non-volatile memory 312 and executed on processor 302 to provide a runtime environment. A runtime environment facilitates extensibility of client device 106 by allowing various interfaces to be defined that, in turn, allow application programs 316 to interact with client device 106. In the illustrated example, a recommendation engine application 318 is stored in non-volatile memory 312. Recommendation engine application 318, when executed causes tuners 300(i) to monitor closed captioning text streams carried in broadcasts on one or more multiplexed channels so as to execute an active and/or passive interest assessment process as described above.

FIG. 5 shows disk drive 308 to have a closed captioning text script buffer 308a, a word and phrase count buffer 308a, video record buffer 308c, and other files by buffer 308d.

Closed captioning script buffer 308a stores incoming streams of closed captioning text for processing by recommend engine application 318 of nonvolatile memory 312. Word and phrase count buffer 308b stores those word and phrases that occur and are ranked by frequency in television programming. Video record buffer 308c stores previously recorded and television programs as well as those programs that are currently being recorded. Other files 308d can be used as temporary buffer to store television programming as it is received until it is determined whether or not the temporarily stored program should be more permanently in digital video record buffer 308c. The criterion by which this determination is made is executed in recommend engine application 318 of nonvolatile memory 312 on processor(s) 302.

The accumulations similar to that illustrated and described with respect to Tables A, B and C, above, can be stored either in word and phrase count module 308b seen in FIG. 5, or in word and phrase count module 127b of the content distribution system 104 seen in FIG. 4. The application program that functions as a recommend engine to process the accumulations seen in Tables A, B and C can be recommendation engine application 127C of FIG. 4 and/or recommend engine application 318 seen in FIG. 5. Either of these application programs can store predetermined thresholds that can be used in the accumulation of words and phrases after which viewer is to be given a notice as to a corresponding program being monitored that is likely to be of interest, or after which the program is to be automatically recorded.

Storage media 306 can be removable media (e.g. diskette, CD, CD-ROM, DVD). Alternatively, storage media 306 can be any other type of media for storing data or instructions that are executable by processor 302. Other application programs 316 that may be implemented at client device 106 include a browser to browse the Web, an email program to facilitate electronic mail, and so on as is typical of local client set-top boxes having Internet access (e.g. Web TV® services provided by Microsoft Corporation of Redmond, Wash., USA) and interactive TV applications. Client device 106 can also include other components pertaining to a television entertainment system which are not illustrated in this example for simplicity purposes. For instance, client device 106 can include a user interface application and user interface lights, buttons, controls, etc. to facilitate viewer interaction with the device.

Client device 106 also includes a decoder 320 to decode a broadcast video signal, such as an NTSC, PAL, SECAM or other TV system video signal. Alternatively, a decoder for client device 106 can be implemented, in whole or in part, as a software application executed by processor(s) 302. Client device 106 further includes a wireless interface 322, a network interface 324, a serial and/or parallel interface 326, and a modem 328. Wireless interface 322 allows client device 106 to receive input commands and other information from a viewer-operated input device, such as from a remote control device or from another IR, Bluetooth, or similar RF input device.

Network interface 324 and serial and/or parallel interface 326 allows client device 106 to interact and communicate with other electronic and computing devices via various communication links. Although not shown, client device 106 may also include other types of data communication interfaces to communicate with other devices. Modem 328 facilitates client device 106 in communications with other electronic and computing devices via a conventional telephone line. Components seen at reference numerals 316 and 322-328 facilitate applications where client device 106 has Internet access or communicates data on a network.

Client device 106 also includes an audio output 330 and a video output 332 that provide signals to a television or other device that processes and/or presents or otherwise renders the audio and video data. Although shown separately, some of the components of client device 106 may be implemented in an application specific integrated circuit (ASIC). Additionally, a system bus (not shown) typically connects the various components within client device 106. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Figure 6:
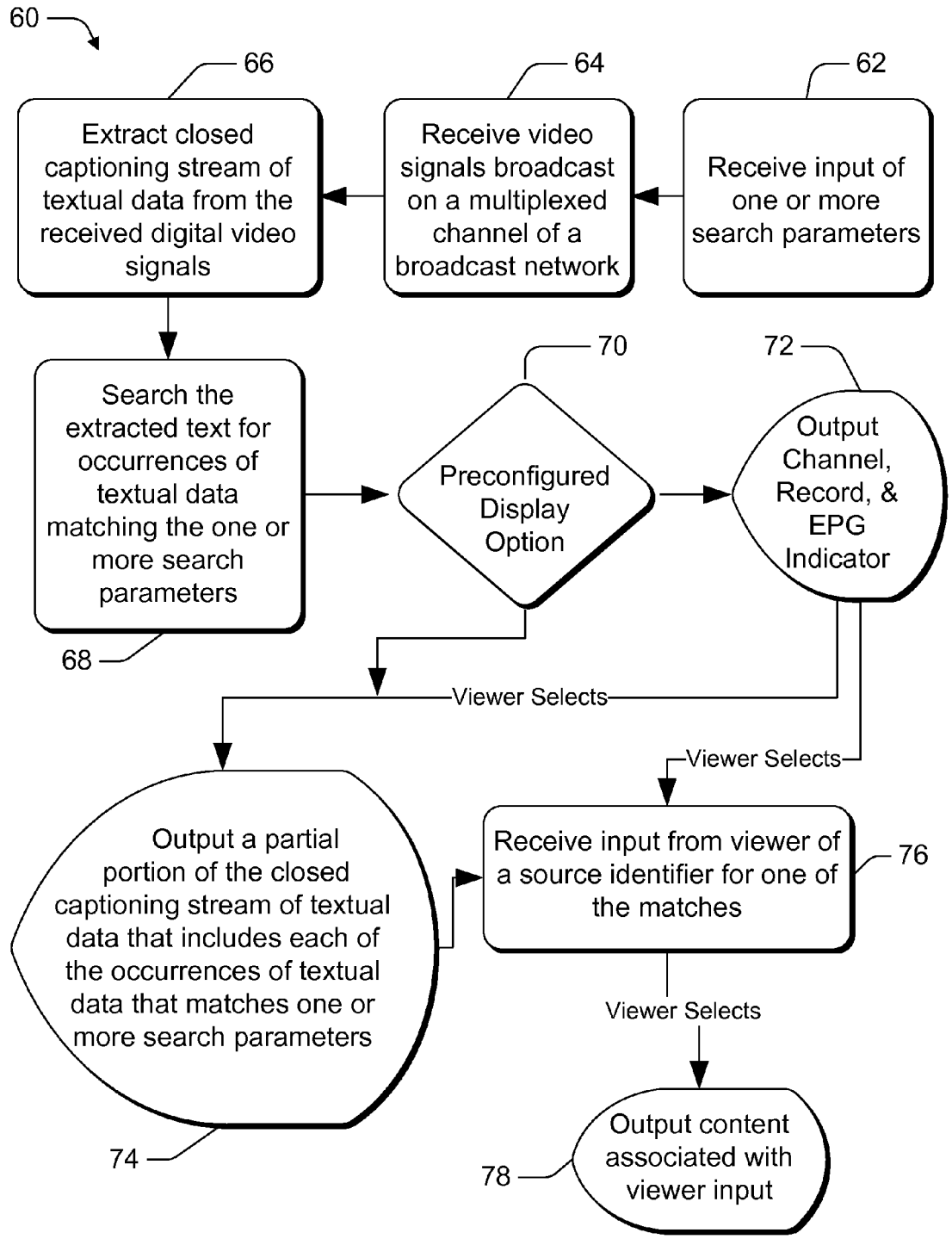
FIG. 6 is a flow diagram that illustrates a process performed by a client device for receiving input of one or more search parameters, receiving video signals broadcast on a multiplexed channel of a broadcast network, extracting a closed captioning stream of textual data from the received video signals, searching the extracted text for occurrences of textual data matching the one or more search parameters, and outputting for display a partial portion of the closed captioning stream of textual data that includes each of the occurrences of textual data that matches the one or more search parameters.

FIG. 6 shows a process 60 for locating content likely to be of interest to a viewer. At block 62, a client device can receive input of one or more search parameters, such as by way of display lines 12-26 seen in FIG. 1. At block 64, the client device can receive digital video signals that are broadcast on a multiplexed channel of a broadcast network. Each tuner in the client device can be tuned to a different channel to receive the video signals thereof. At block 66, the client device uses its decoder to extract the closed captioning stream of textual data in the received digital video signals of each channel for each tuner. In practice, the client device can strip the non-video data in the Vertical Blanking Interval (VBI) that contains a closed captioning script.

At block 68, the client device searches the extracted text for occurrences of textual data matching the one or more search parameters as defined in active and/or passive interest assessment processes. This search can be performed using a parsing application executing in the client device to monitor the successive word groups in the closed captioning script. The parsing application adds the count of each word or sequence of words (i.e. a phrase) to a previous count of the same from a previously processed closed captioning script such that the result of the count is kept in a data structure. If no match to a previously counted word or phrase occurs, the parsing application continues to the next word or phrase to initialize a new count for the same. While the entire closed captioning script can be monitored as described, it is also contemplated that only a portion of the closed captioning script might be monitored or sampled for selected time periods. Such a sampling technique for each channel might be able to allocate the tuner resources of a client device more broadly in the process of identification of broadcast content likely to be of interest to a viewer. As such, the results derived from a properly configured channel sampling technique can be used to achieve similar quality results to that of an exhaustive monitoring technique.

The client device can be preconfigured to output a display to a television receiver. By way of example, the client device can be preconfigured to output a display corresponding to the display seen in FIG. 2, or to output a display corresponding to the display seen in FIG. 3. At block 70, the preconfiguration of the client device is interpreted and process 60 moves either to block 72 or to block 76. In block 72, the output to the television receiver from the client device corresponds to display line 224 of FIG. 2. From block 72, the viewer can use an input device at block 76, such at that seen at reference numerals 204-208 of FIG. 2, to highlight and select the corresponding indicator in the displayed output to view the programming content thereof as process 60 moves to block 78. By way of example, one of the indicators in display line 224 of FIG. 2 can be highlighted and selected to display its corresponding content.

In block 74, the output to the television receiver from the client device corresponds to display seen in FIG. 3. From block 76, the viewer can use an input device at block 76, such at that seen at reference numerals 204-208 of FIG. 2, to highlight and select the corresponding indicator in the displayed output to view the programming content thereof. By way of example, one of the indicators in display lines 34-46 of FIG. 3 can be highlighted and selected to display its corresponding content as process 60 moves to block 78. This displayed output is more particular in the output thereof that that of FIG. 2. FIG. 3 includes partial portions of the closed captioning stream of textual data that include, in context, each occurrence of textual data that matches one or more search parameters. This output can be a scrolling display of each matching word or phrase as is appears in context of adjacent words in the closed captioning script. As seen in FIG. 3, the matches are shown in respective context and can be scrolled horizontally to show chronologically forward and backward occurrences of matches in the closed captioning script. The matches in context can be shown for each channel and for each previously recorded program by scrolling the display vertically so as to view additionally channel and pre-recorded programs.

In one implementation, any text stream that is synchronized with a stream data can be monitored to detect content likely to be of interest to a viewer. As such, the stream of data that can be monitored can be a video stream of data, an audio stream of data, and/or other streams of data. Moreover, the synchronized text stream does not need to be an explicit part of the broadcast. Instead of using closed-caption data to filter the content in which the closed captioning appears, a stream of content related data can also be used. For example, a text stream of a chat room on the Internet in which television programming is discussed can be used to filter the television programming being discussed in the chat room for content that is likely to be of interest to a viewer. As an example of this implementation, the text stream being filtered is found at a Web hosting service for the chat room while the television programming identified as being likely to be of interest to the viewer is broadcast on a TV network (e.g. CBS, NBC, HBO, CNN, etc.). The implementation can be performed by receiving a steam of data contained in signals that are broadcast on a multiplexed channel of a broadcast network. There is then extracted from the received stream of data a stream of textual data, where the stream of textual data is synchronized with the received stream of data. The stream of textual data is searched to locate occurrences of textual data matching one or more search parameters. The search parameters can be predetermined. A display device can then receive a sequential output of a partial portion of the stream of textual data that includes each of the occurrences of textual data that matched one or more of the search parameters. The technique for searching the stream of textual data can include comparing the stream of textual data to a primary list and a passive list, where the active list includes one or more predefined character strings and the passive list includes one or more character strings that have been previously extracted one or more times. Multiple channels of simultaneously received streams of data can be processed similarly in order to identify derive content being carrying by each of the channels that is likely to be of interest to a viewer.

General reference is made herein to one or more client devices, such as client device 106. As used herein, "client device" means any electronic device having data communications, data storage capabilities, and/or functions to process signals, such as broadcast signals, received from any of a number of different sources.

While the foregoing applications have been described in terms of a local client set-top box, the inventors contemplate other client devices—any of which can communicate with a broadcast network, such as through a cable or satellite modem. Additionally, the display mechanism for a client device need not be a television but can other output devices, such as a storage device (e.g. a hard drive), a printer (e.g. a ticker tape machine to print out stock prices), an image projector for viewing on a projection screen, etc.

Portions of the client devices, set top boxes, methods, program products, and systems described herein may be implemented in any combination of hardware, software, and/or firmware. For example, one or more application specific integrated circuits (ASICs) or programmable logic devices (PLDs) could be designed or programmed to implement one or more of these portions.

Although the methods, program products, and systems have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:
1. A method comprising:
under control of one or more processors specifically configured with executable instructions, creating a passive list of search terms by monitoring closed captioning streams of textual data of video signals that a viewer views or records, the search terms in the passive list comprising character strings extracted from the closed captioning streams of textual data based on a frequency of occurrence in the closed captioning streams of textual data;

extracting, from a newly received first video signal, a first closed captioning stream of textual data;

searching the first closed captioning stream for occurrences of textual data matching the search terms in the passive list;

determining whether a number of matches of the search terms in the passive list with the first closed captioning stream exceeds a threshold number;

when the number of matches of the search terms of the passive list does not exceed the threshold number after a predetermined period of time, ceasing to search the first closed captioning stream of textual data before an end of the first closed captioning stream is reached, deleting corresponding content programming of the first video signal from a buffer, and searching instead a second closed captioning stream of textual data from a newly received second video signal; and outputting a notification when the number of matches of the search terms of the passive list in comparison with the textual data exceeds the threshold number, indicating that content programming determined to be of interest to the viewer has been located.

2. The method as recited in claim 1, further comprising creating an active list of search terms by receiving input from the viewer at a user interface to develop the active list of search terms, the searching including searching for occurrences of textual data matching the search terms in the active list; and applying a greater weight to the search terms in the active list than a weight applied to the search terms in the passive list when counting the number of matches.

3. The method as recited in claim 1, further comprising outputting the notification by displaying a notification message as a display line displayed in conjunction with programming that the viewer is viewing, wherein the display line specifies at least one channel currently having the content programming determined to be of interest to the viewer.

4. The method as recited in claim 1, wherein the notification is displayed using at least one process performed on a television that is selected from a group consisting of picture in picture, split screen, video text and selective picture.

5. The method as recited in claim 1, further comprising notifying the viewer that the content programming determined to be of interest to the viewer has been located by sending a notification message to a telephone number of the viewer.

6. The method as recited in claim 1, further comprising recording the content programming determined to be of interest to the viewer when the viewer does not respond to the notification within a predetermined period of time.

7. The method as recited in claim 1, further comprising:
storing the content programming corresponding to the first and second newly received video signals in the buffer while searching the corresponding streams of textual data; and following the determining that the number of matches exceeds the threshold number, recording the content programming as a recording by moving content of the buffer to a more permanent storage location than the buffer so that a beginning of the content programming is included in the recording.

8. The method as recited in claim 1, wherein the character strings comprising the search terms in the passive list include only verbs, nouns or proper nouns to reduce a counting overhead associated with the passive list.

9. A client device comprising:
a processor;
a memory; and
an application maintained on the memory and executed on the processor to perform operations that include:
creating a passive list of search terms from previously received closed captioning streams of textual data of received video signals that the viewer has viewed or recorded;
receiving a first closed captioning stream of textual data associated with a newly received first video signal;
searching the first closed captioning stream for occurrences of textual data matching the search terms in the passive list;
determining whether a number of matches of the search terms of the passive list with the first closed captioning stream exceeds a threshold number; and
when the number of matches of the search terms of the passive list does not exceed the threshold number after a predetermined period of time, ceasing to search the first closed captioning stream before an end of the first closed captioning stream is reached, and searching instead a second closed captioning stream of textual data associated with a newly received second video signal.

10. The client device as recited in claim 9, further comprising a signal output device to output a notification when the number of matches exceeds the threshold number.

11. The client device as recited in claim 9, further comprising:
a plurality of tuners to receive a respective plurality of channels carrying video signals including the first and second video signals; and
a closed caption decoder to extract, from the channels, at least the first and second closed captioning streams of textual data.

12. The client device as recited in claim 9, further comprising a user interface to present to a viewer to develop search terms for creating an active list of search terms, wherein:
the active list includes one or more viewer specified character strings as the search terms in the active list; and
the application is executed to also search for the search terms in the active list when searching the closed captioning streams of textual data for the search terms in the passive list.

13. The client device as recited in claim 9, further comprising a storage device to store the received video signals, wherein the passive list includes one or more character strings from one or more previously received closed captioning streams of textual data corresponding to one or more of the received video signals that have been stored on the storage device.

14. The client device as recited in claim 9, further comprising a buffer for storing content programming of the video signals during the searching of corresponding closed captioning streams of textual data, wherein, following a determination that the number of matches exceeds the threshold number, the application is further executed to record the content programming of the buffer as a recording by moving the content programming of the buffer to a more permanent storage location than the buffer so that a beginning of the content programming is included in the recording.

15. The client device as recited in claim 9, further comprising a buffer for storing content programming of the video signals during the searching of corresponding closed captioning streams of textual data, wherein, when the number of matches does not exceed the threshold number after the predetermined period of time, the application is further executed to delete the corresponding content programming from the buffer.

16. A method comprising:
under control of one or more processors specifically configured with executable instructions,
creating a passive list of a plurality of search terms based on content programming that a viewer records or views;
searching a first closed captioning stream of textual data corresponding to a first video signal on a first channel for occurrences of textual data matching one or more of the search terms in the passive list; and
when a number of matches of the search terms with the first closed captioning stream does not exceed a threshold number following expiration of a threshold time period, ceasing to search the first closed captioning stream, deleting content programming corresponding to the first closed captioning stream from a buffer, and commencing searching of a second closed captioning stream of textual data corresponding to a second video signal on a second channel.

17. The method as recited in claim 16, wherein creating the passive list further comprises:
monitoring at least one closed captioning stream corresponding to at least one video signal that a viewer records or views;
extracting words and phrases as potential search terms from the at least one closed captioning stream; and
selecting the search terms of the passive list from the potential search terms based on a recentness and a frequency of occurrence of the extracted words and phrases.

18. The method as recited in claim 16, further comprising, following a determination that the number of matches exceeds the threshold number, sending a notification that content programming determined to be of interest to the viewer has been located.

19. The method as recited in claim 16, further comprising:
creating an active list comprising a plurality of search terms provided by the viewer through a user interface, the searching including searching for occurrences of textual data matching the search terms in the active list; and
applying a greater weight to the search terms in the active list than a weight applied to the search terms in the passive list when counting the number of matches.

20. The method as recited in claim 16, further comprising, following a determination that the number of matches exceeds the threshold number, recording the content programming as a recording by moving content of the buffer to a more permanent storage location than the buffer so that a beginning of the content programming is included in the recording.

* * * * *